United States Patent
Zhang et al.

(10) Patent No.: US 11,260,529 B2
(45) Date of Patent: Mar. 1, 2022

(54) VIRTUAL RAIL BASED CRUISE METHOD AND APPARATUS AND ROBOT USING THE SAME

(71) Applicant: UBTECH ROBOTICS CORP LTD, Shenzhen (CN)

(72) Inventors: Jian Zhang, Shenzhen (CN); Youjun Xiong, Shenzhen (CN); Zhichao Liu, Shenzhen (CN); Longbiao Bai, Shenzhen (CN); Chenchen Jiang, Shenzhen (CN); Simin Zhang, Shenzhen (CN); Hongjian Liu, Shenzhen (CN); Zhanjia Bi, Shenzhen (CN); Yongsheng Zhao, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 193 days.

(21) Appl. No.: 16/584,968

(22) Filed: Sep. 27, 2019

(65) Prior Publication Data
US 2020/0198135 A1     Jun. 25, 2020

(30) Foreign Application Priority Data
Dec. 19, 2018     (CN) .......................... 201811566608.5

(51) Int. Cl.
G05B 19/23     (2006.01)
G05D 1/02     (2020.01)
B25J 9/16     (2006.01)

(52) U.S. Cl.
CPC ............ B25J 9/1664 (2013.01); G05B 19/23 (2013.01); G05D 1/0212 (2013.01)

(58) Field of Classification Search
CPC .... G05D 1/0274; G05D 1/0212; G05B 19/23; G05B 2219/40519; B25J 9/1664
See application file for complete search history.

(56) References Cited

U.S. PATENT DOCUMENTS

| | | | |
|---|---|---|---|
| 2002/0153184 A1* | 10/2002 | Song | A47L 9/2884 180/167 |
| 2004/0158354 A1* | 8/2004 | Lee | G05D 1/028 700/245 |
| 2008/0009964 A1* | 1/2008 | Bruemmer | G05D 1/0223 700/245 |
| 2008/0027591 A1* | 1/2008 | Lenser | G05D 1/0251 701/2 |
| 2009/0149990 A1* | 6/2009 | Myeong | G05D 1/0274 700/245 |

(Continued)

Primary Examiner — Stephen Holwerda (57) ABSTRACT

The present disclosure provides a virtual rail based cruise method as well as an apparatus and a robot using the same. The method includes: obtaining a digital map including a virtual rail; performing a path planning based on the virtual rail, a current position of the robot, and a cruise end point to obtain a cruise path; and obtaining parameter(s) of the robot by calculating through a preset path tracking algorithm based on the cruise path and the current position of the robot, and controlling the robot based on the control parameter(s). In this manner, the problems of the prior art that needs to lay a rail or set an auxiliary device which causes high cost and inconvenience in usage as well as the rail needs to be re-laid or the auxiliary device needs to be reinstalled when the route is to be changed can be solved.

16 Claims, 4 Drawing Sheets

S101 — Obtain a digital map including a virtual rail

S102 — Perform a path planning based on the virtual rail, a current position of the robot, and a cruise end point to obtain a cruise path S103 — Obtain parameter(s) of the robot by calculating through a preset path tracking algorithm based on the cruise path and the current position of the robot, and control the robot based on the control parameter(s)

(56) References Cited

U.S. PATENT DOCUMENTS

| | | | | |
|---|---|---|---|---|
| 2010/0020093 | A1* | 1/2010 | Stroila | G01C 21/20 345/589 |
| 2012/0283905 | A1* | 11/2012 | Nakano | G05D 1/0214 701/25 |
| 2017/0285643 | A1* | 10/2017 | Ichinose | G01S 17/08 |

* cited by examiner

VIRTUAL RAIL BASED CRUISE METHOD AND APPARATUS AND ROBOT USING THE SAME

CROSS REFERENCE TO RELATED APPLICATIONS

This application claims priority to Chinese Patent Application No. 201811566608.5, filed Dec. 19, 2018, which is hereby incorporated by reference herein as if set forth in its entirety.

BACKGROUND

1. Technical Field

The present disclosure relates to robot technology, and particularly to a virtual rail based cruise method as well as an apparatus and a robot using the same.

2. Description of Related Art

With the development of science and technology, robots are increasingly used in various fields. In which, rail based cruise is a key technology in the actual application scenarios of mobile robots. In the application scenario that needs to guarantee the safety and reliability of robots, rail based cruise is usually the best manner to realize cruises.

In the prior art, the rail based cruise methods for mobile robots are mainly divided into the kinds that are realized by laying rails and installing auxiliary devices, respectively. In which, laying rails refers to laying magnetic guiding rails to realize the target cruise on a preset trajectory using a magnetic guiding physical traction systems, which is used in, for example, urban trains and meal delivery robots. Installing auxiliary devices refers to installing auxiliary devices such as laser reflectors and RFID tags in the application environment of the robots, so that the robot can realize the target cruise on a preset trajectory according to the guidance of the auxiliary device.

However, the above-mentioned two kinds of rail based cruise methods require laying rails or installing auxiliary device in the application environment, which are costly and inflexible in usage while re-laying rails or reinstalling auxiliary devices are needed when the route is to be changed.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

Embodiment One

Figure 1:
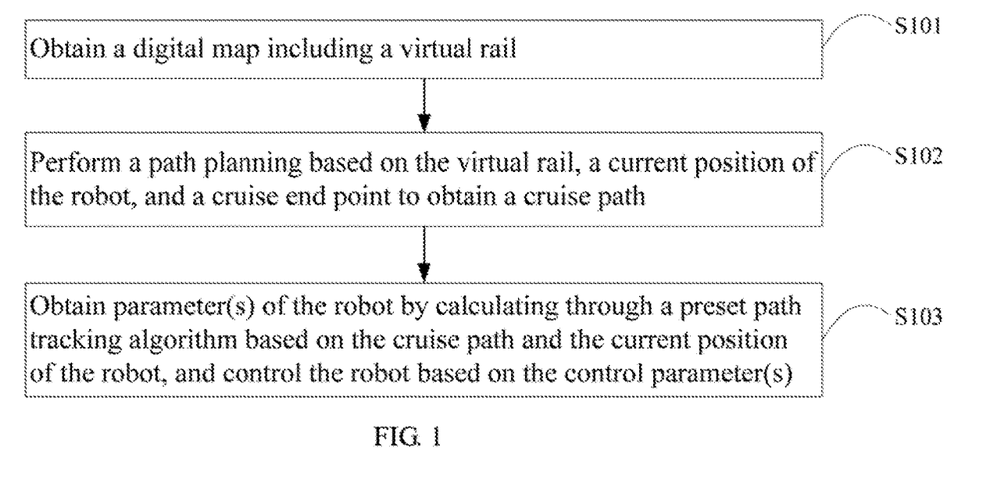
FIG. 1 is a flow chart of an embodiment of a virtual rail based cruise method according to the present disclosure.

FIG. 1 is a flow chart of an embodiment of a virtual rail based cruise method according to the present disclosure. In this embodiment, a cruise method based on virtual rails which is for a robot (e.g., a mobile robot) having a localization equipment such as a laser sensor, a visual sensor, or a UWB (ultra-wideband) tag is provided. The method is a computer-implemented method executable for a processor of the robot, which may be implemented through and applied to a virtual rail based cruise apparatus shown in FIG. 3 or a robot shown in FIG. 4, or implemented through a computer readable storage medium. As shown in FIG. 1, the method includes the following steps.

S101: obtaining a digital map including a virtual rail.

In the case that it needs to control the robot to cruise along a rail, a user of the robot can create a digital map including the virtual rail and labeling area(s) of the virtual rail in the digital map. In which, the virtual rail corresponds to a real rail in an application environment of the robot, which can be created through a drawing software.

S102: performing a path planning based on the virtual rail, a current position of the robot, and a cruise end point to obtain a cruise path.

After obtaining the digital map including the virtual rail, the robot can obtain the cruise path based on the virtual rail, the current position of the robot, and the cruise end point. The algorithm for performing the path planning can be selected according to actual needs. For example, the Dijkstra algorithm can be selected to perform the path planning. In this embodiment, the current position of the robot is a position at which the robot is located. The current position of the robot can be obtained by, for example, positioning the robot by a localization method such as laser localization, visual localization, or UWB localization to obtain a coordinate of the current position of the robot in a specified coordinate system.

S103: obtaining parameter(s) of the robot by calculating through a preset path tracking algorithm based on the cruise path and the current position of the robot, and controlling the robot based on the control parameter(s).

After obtaining the cruise path through the path planning, it can calculate using the preset path tracking algorithm based on the cruise path and the current position of the robot to obtain the control parameter(s) of the robot, so as to control the robot based on the control parameter(s).

Figure 4:
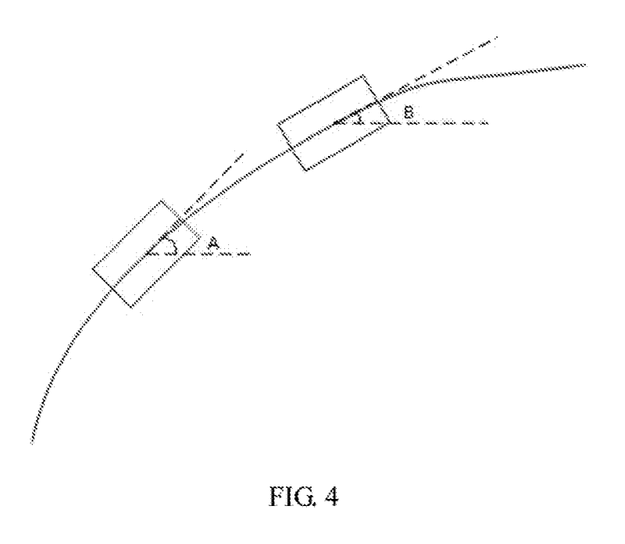
FIG. 4 is a schematic diagram of a robot traveling in a cruise path according to an embodiment of the present disclosure.

The kind of the preset path tracking algorithm can be selected according to actual needs. For instance, the linear velocity and the angular velocity of the robot can be calculated through the following tracking control rate formula:

$$\begin{cases} \omega = k\Delta\varphi + \varphi_d \\ v = \gamma\rho\cos(\Delta\varphi) \end{cases};$$

where, $\omega$ is the angular velocity of the robot, $v$ is the linear velocity of the robot, $k$ and $\gamma$ are preset constants, and $\Delta\varphi$ is a pose included angle between a forward-looking position point in the cruise path and the current position of the robot. FIG. 4 is a schematic diagram of a robot traveling in a cruise path according to an embodiment of the present disclosure. As shown in FIG. 4, the pose included angle is the difference between a pose angle B of the robot at the forward-looking position point and a pose angle A of the robot at the current position, $\rho$ is the Euclidean distance between the forward-looking position point in the cruise path and the current position of the robot, and $\varphi_d$ is a virtual angular velocity of the robot.

It can use the above-mentioned tracking control rate formula to calculate the linear velocity and the angular velocity of the robot, control the movement velocity of the robot according to the linear velocity, and adjust the pose (i.e., the position and the posture) of the robot according to the angular velocity, so that the robot moves according to the cruise path.

Furthermore, step S101 includes:

A1: obtaining area data of the virtual rail, and performing a rasterization on the digital map based on the area data of the virtual rail to obtain the digital map including the virtual rail.

When obtaining the digital map including the virtual rail, the area data of the virtual rail which planned by the user can be obtained first, and then the digital map can be rasterized based on the area data of the virtual rail. A raster in the rasterized digital map includes two attribute values. The areas of the virtual rail and the areas of the non-virtual rail are labeled with different attribute values to obtain the digital map including the virtual rail. For example, the raster of the areas of the virtual rail can be assigned an occupation attribute while the areas of the non-virtual rail can be assigned a non-occupation attribute, so as to distinguish the areas of the virtual rail from the areas of the non-virtual rail area to obtain the digital map including the virtual rail.

Furthermore, in one embodiment, step S102 may include:

B1: performing the path planning through a preset path planning algorithm based on the current position of the robot and the cruise end point to obtain the cruise path, if the current position of the robot and the cruise end point are both within the virtual rail.

In the case that the current position of the robot and the cruise end point are both in the virtual rail, the cruise path can be planned directly based on the current position of the robot and the cruise end point to obtain the cruise path.

Furthermore, step S102 may also include:

C1: taking a point of the virtual rail that is closest to the current position of the robot as a rail entry position point and/or taking a point of the virtual rail that is closest to the cruise end point as a rail exit position point, if the current position of the robot and/or the cruise end point are not within the virtual rail.

In the case that the current position of the robot and/or the cruise end point are not within the virtual rail, it needs to plan a rail entry path for the robot to enter the rail and/or a rail exit path for the robot to exit the rail to reach the cruise end point.

In this case, it can determine that the robot enters the rail and/or exits the rail from which positions first. For the convenience of calculation, it can take the point of the virtual rail that is closest to the current position of the robot as the rail entry position point and/or take the point of the virtual rail that is closest to the cruise end point as the rail exit position point.

C2: taking a linear path from the current position of the robot to the rail entry position point as a rail entry path and/or taking a linear path from the rail exit position point to the cruise end point as a rail exit path.

After obtaining the rail entry position point and/or the rail exit position point, the planning of the path that is outside the virtual rail can be performed by linear interpolation, which takes the linear path from the current position of the robot to the rail entry position point as the rail entry path and/or takes the linear path from the rail exit position point to the cruise end point as the rail exit path.

C3: performing the path planning through a preset path planning algorithm based on the current position of the robot and the rail exit position point, the rail entry position point and the cruise end point, or the rail entry position point and the rail exit position point to obtain the rail path.

In the case that the current position of the robot is in the virtual rail while the cruise end point is not in the virtual rail, it performs the path planning through the preset path planning algorithm based on the current position of the robot and the rail exit position point to obtain the rail path.

In the case that the current position of the robot is not in the virtual rail while the cruise end point is in the virtual rail, it performs the path planning through the preset path planning algorithm based on the rail entry position point and the cruise end point to obtain the rail path.

In the case that the current position of the robot and the cruise end point are both not in the virtual rail, it performs the path planning through the preset path planning algorithm based on the rail entry position point and the rail exit position point to obtain the rail path.

C4: connecting the rail path with the rail entry path and/or the rail exit path to obtain the cruise path.

By connecting the rail path with the rail entry path and/or the rail exit path, the complete cruise path can be obtained.

Furthermore, before step S103 further includes:

D1: smoothing the cruise path through a preset curve fitting algorithm to obtain the smoothed cruise path.

Since the cruise path obtained through the preset path planning algorithm may have more glitch or unsmoothness, it can smooth the cruise path planned using the preset path planning algorithm through the preset curve fitting algorithm to obtain the smoothed cruise path so that the robot can move according to the cruise path in a more smooth manner.

The preset curve fitting algorithm can be selected according to actual needs, for example, the three degree B-spline algorithm can be selected for curve fitting.

In the virtual rail based cruise method provided by embodiment one, the cruise path is obtained by performing path planning based on the virtual rail on the digital map, the current position of the robot, and the cruise end point, and then the control parameter(s) of the robot is calculated through the preset path tracking algorithm so as to control the robot to move along the cruise path based on the control parameter(s). During the cruise of the robot, it does not need to lay rails and install auxiliary devices. The area(s) of the virtual rail is planned on the digital map, and the robot can be controlled to cruise in the virtual rail by using the path planning algorithm and the path tracking algorithm, which reduces the cost. In addition, when the route needs to be changed, the area(s) of the virtual rail can be re-planned on the digital map, which is flexible in usage and solves the problems in the rail cruise methods of the prior art that needs to lay a rail or set an auxiliary device in an application environment which causes high cost and inconvenience in usage as well as the rail needs to be re-laid or the auxiliary device needs to be reinstalled when the route is to be changed.

When obtaining the digital map including the virtual rail, the area data of the virtual rail which planned by the user can be obtained first, and the digital map is rasterized based on the area data of the virtual rail to obtain the digital map including the virtual rail.

If the current position of the robot and the cruise end point are both in the virtual rail, the path planning in the virtual rail can be performed directly; if the current position of the robot and/or the cruise end point are not in the virtual rail, in addition to performing the path planning in the virtual rail, it further needs to obtain the rail entry path and/or the rail exit path of the robot, and connect the rail path in the virtual rail with the rail entry path and/or the rail exit path to obtain the complete cruise path.

In addition, the cruise path can be smoothed using the preset curve fitting algorithm to reduce the glitch and unsmoothness in the cruise path so that the robot can move along the cruise path smoothly.

It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment Two

Figure 2:
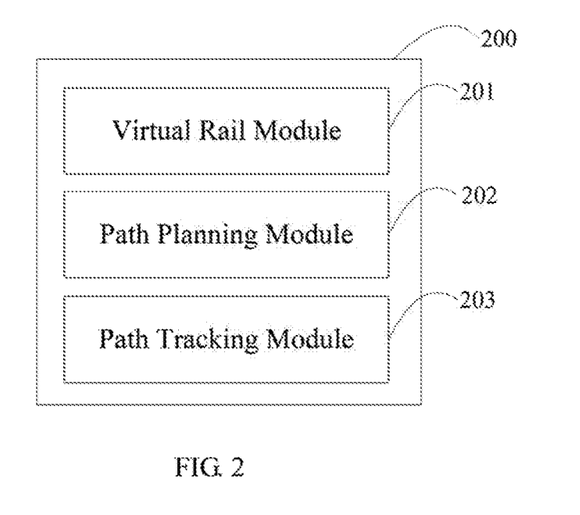
FIG. 2 is a schematic block diagram of an embodiment of a virtual rail based cruise apparatus according to the present disclosure.

FIG. 2 is a schematic block diagram of an embodiment of a virtual rail based cruise apparatus according to the present disclosure. Embodiment two of the present disclosure provides a virtual rail based cruise apparatus 200 for a robot having a localization equipment such as a laser sensor, a visual sensor, or a UWB tag is provided. In this embodiment, the virtual rail based cruise apparatus 200 can be applied a robot shown in FIG. 3 or be the robot itself. For convenience of description, only parts related to the present disclosure are shown. As shown in FIG. 2, the virtual rail based cruise apparatus includes, a virtual rail module 201 configured to obtain a digital map including a virtual rail;

a path planning module 202 configured to perform a path planning based on the virtual rail, a current position of the robot, and a cruise end point to obtain a cruise path; and a path tracking module 203 configured to obtain control parameter(s) of the robot by calculating through a preset path tracking algorithm based on the cruise path and the current position of the robot and control the robot based on the control parameter(s).

Furthermore, in one embodiment, the virtual rail module 201 is configured to obtain area data of the virtual rail and perform a rasterization on the digital map based on the area data of the virtual rail to obtain the digital map including the virtual rail.

Furthermore, in one embodiment, the path planning module 202 can be configured to perform the path planning through a preset path planning algorithm based on the current position of the robot and the cruise end point to obtain the cruise path, if the current position of the robot and the cruise end point are both within the virtual rail.

Furthermore, in one embodiment, the path planning module 202 may include:

a position point submodule configured to take a point of the virtual rail that is closest to the current position of the robot as a rail entry position point and/or taking a point of the virtual rail that is closest to the cruise end point as a rail exit position point, if the current position of the robot and/or the cruise end point are not within the virtual rail;

an off-rail sub-module configured to take a linear path from the current position of the robot to the rail entry position point as a rail entry path and/or taking a linear path from the rail exit position point to the cruise end point as a rail exit path;

an on-rail sub-module configured to perform the path planning through a preset path planning algorithm based on the current position of the robot and the rail exit position point, the rail entry position point and the cruise end point, or the rail entry position point and the rail exit position point to obtain the rail path; and a path sub-module configured to connect the rail path with the rail entry path and/or the rail exit path to obtain the cruise path.

Furthermore, in one embodiment, the apparatus may further include:

a smoothing module configured to smooth the cruise path through a preset curve fitting algorithm to obtain the smoothed cruise path.

In this embodiment, each of the above-mentioned modules/units is implemented in the form of software, which can be computer program(s) stored in a memory of the virtual rail based cruise apparatus 200 and executable on a processor of the virtual rail based cruise apparatus 200. In other embodiments, each of the above-mentioned modules/units may be implemented in the form of hardware (e.g., a circuit of the virtual rail based cruise apparatus 200 which is coupled to the processor of the virtual rail based cruise apparatus 200) or a combination of hardware and software (e.g., a circuit with a single chip microcomputer).

It should be noted that, the information interaction, the execution process, and the like between the above-mentioned modules/units are based on the same concept with the above-mentioned method embodiments of the present disclosure. For details of the specific functions and the technical effects, reference may be made to the corresponding method embodiment, and are not described herein.

Embodiment Three

Figure 3:
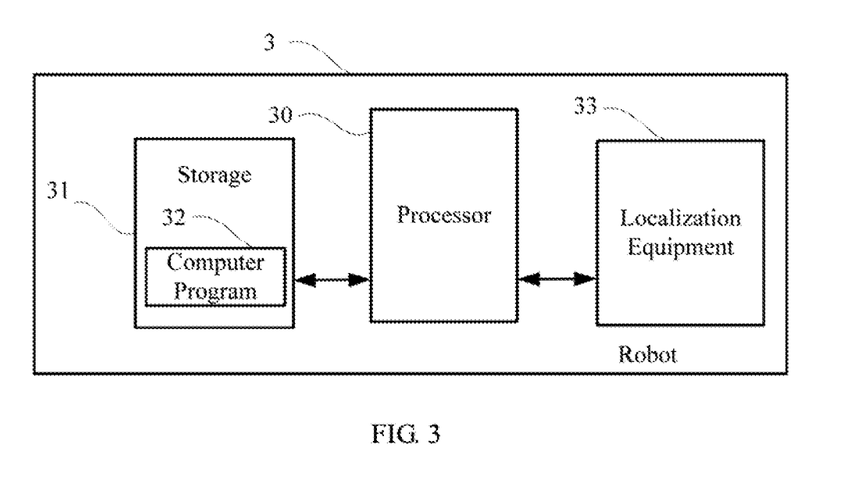
FIG. 3 is a schematic block diagram of an embodiment of a robot according to the present disclosure.

FIG. 3 is a schematic block diagram of an embodiment of a robot according to the present disclosure. In this embodiment, a robot 3 such as a mobile robot is provided. As shown in FIG. 3, in this embodiment, the robot 3 includes a processor 30, a storage 31, a computer program 32 stored in the storage 31 and executable on the processor 30, and a localization equipment 33. When executing (instructions in) the computer program 32, the processor 30 implements the steps in the above-mentioned embodiments of the virtual rail based cruise method, for example, steps S101-S103 shown in FIG. 1. Alternatively, when the processor 30 executes the (instructions in) computer program 32, the functions of each module/unit in the above-mentioned device embodiments, for example, the functions of the modules 201-203 shown in FIG. 2 are implemented.

Exemplarily, the computer program 32 may be divided into one or more modules/units, and the one or more modules/units are stored in the storage 31 and executed by the processor 30 to realize the present disclosure. The one or more modules/units may be a series of computer program instruction sections capable of performing a specific function, and the instruction sections are for describing the execution process of the computer program 32 in the robot 3. For example, the computer program 32 can be divided into a virtual rail module, a path planning module, and a path tracking module. The function of each module is as follows:

the virtual rail module is configured to obtain a digital map including a virtual rail;

the path planning module is configured to perform a path planning based on the virtual rail, a current position of the robot, and a cruise end point to obtain a cruise path; and the path tracking module is configured to obtain control parameter(s) of the robot by calculating through a preset path tracking algorithm based on the cruise path and the current position of the robot and control the robot based on the control parameter(s).

The robot 3 may include, but is not limited to, the processor 30 and the storage 31. It can be understood by those skilled in the art that FIG. 3 is merely an example of the robot 3 and does not constitute a limitation on the robot 3, and may include more or fewer components than those shown in the figure, or a combination of some components or different components. For example, the robot 3 may further include an input/output device, a network access device, a bus, and the like.

The processor 30 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 31 may be an internal storage unit of the robot 3, for example, a hard disk or a memory of the robot 3. The storage 31 may also be an external storage device of the robot 3, for example, a plug-in hard disk, a smart media card (SMC), a secure digital (SD) card, flash card, and the like, which is equipped on the robot 3. Furthermore, the storage 31 may further include both an internal storage unit and an external storage device, of the robot 3. The storage 31 is configured to store the computer program 32 and other programs and data required by the robot 3. The storage 31 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit, in addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented virtual rail based cruise method for a robot comprising executing on a processor of the robot steps of:
    obtaining area data of a virtual rail, performing a rasterizztion on a digital map based on the area data of the virtual rail, and labeling areas of the virtual rail and areas of a non-virtual rail with different attribute values in the rasterized digital map to obtain the digital map comprising the virtual rail;
    performing a path planning based on the virtual rail, a current position of the robot, and a cruise end point to obtain a cruise path; and
    obtaining one or more control parameters of the robot by calculating through a preset path tracking algorithm based on the cruise path and the current position of the robot, and controlling the robot based on the one or more control parameters;
    wherein the step of performing the path planning based on the virtual rail, the current position of the robot, and the cruise end point to obtain the cruise path comprises:
    taking a point of the virtual rail closest to the current position of the robot as a rail entry position point, in response to the current position of the robot being not within the virtual rail;
    taking a point of the virtual rail closest to the cruise end point as a rail exit position point, in response to the cruise end point being not within the virtual rail;
    taking a linear path from the current position of the robot to the rail entry position point as a rail entry path and taking a linear path from the rail exit position point to the cruise end point as a rail exit path;
    performing the path planning through a preset path planning algorithm based on one of the current position of the robot and the rail exit position point, the rail entry position point and the cruise end point, and the rail entry position point and the rail exit position point to obtain the rail path; and
    connecting the rail path with at least one of the rail entry path and the rail exit path to obtain the cruise path; and
    wherein the step of performing the path planning through the preset path planning algorithm based on one of the current position of the robot and the rail exit position point, the rail entry position point and the cruise end point, and the rail entry position point and the rail exit position point to obtain the rail path comprises:
    in response to the current position of the robot being within the virtual rail while the cruise end point being not within the virtual rail, performing the path planning through the preset path planning algorithm based on the current position of the robot and the rail exit position point to obtain the rail path;
    in response to the current position of the robot being not within the virtual rail while the cruise end point being within the virtual rail, performing the path planning through the preset path planning algorithm based on the rail entry position point and the cruise end point to obtain the rail path; and
    in response to the current position of the robot and the cruise end point being both not within the virtual rail, performing the path planning through the preset path planning algorithm based on the rail entry position point and the rail exit position point to obtain the rail path.

2. The method of claim 1, wherein the step of performing the path planning based on the virtual rail, the current position of the robot, and the cruise end point to obtain the cruise path comprises:
    performing the path planning through a preset path planning algorithm based on the current position of the robot and the cruise end point to obtain the cruise path, in response to the current position of the robot and the cruise end point being both within the virtual rail.

3. The method of claim 1, wherein before the step of obtaining the one or more control parameters of the robot by calculating through the preset path tracking algorithm based on the cruise path and the current position of the robot, and controlling the robot based on the one or more control parameters further comprises:
    smoothing the cruise path through a preset curve fitting algorithm to obtain the smoothed cruise path.

4. The method of claim 3, wherein the preset curve fitting algorithm comprises a three degree B-spline algorithm.

5. The method of claim 1, wherein the robot comprises a localization equipment, and the current position of the robot is obtained through the localization equipment.

6. The method of claim 1, wherein a raster of the areas of the virtual rail is assigned an occupation attribute, and a raster of the areas of the non-virtual rail is assigned a non-occupation attribute.

7. The method of claim 1, wherein the path planning is performed through a Dijkstra algorithm.

8. The method of claim 1, wherein the one or more control parameters comprise a linear velocity and an angular velocity of the robot, and the linear velocity and the angular velocity of the robot are calculated through following tracking control rate formula:

$$\begin{cases} \omega = k\Delta\varphi + \varphi_d \\ v = \gamma\rho\cos(\Delta\varphi) \end{cases};$$

where, $\omega$ is the angular velocity of the robot, $v$ is the linear velocity of the robot, $k$ and $\gamma$ are preset constants, $\Delta\varphi$ is a pose comprised angle between a forward-looking position point in the cruise path and the current position of the robot.

9. The method of claim 8, wherein the pose comprised angle is a difference between a pose angle of the robot at the forward-looking position point and a pose angle of the robot at the current position of the robot, $\rho$ is an Euclidean distance between the forward-looking position point in the cruise path and the current position of the robot, and $\varphi_d$ is a virtual angular velocity of the robot.

10. A virtual rail based cruise apparatus for a robot comprising:
 a virtual rail module configured to obtain area data of a virtual rail, perform a rasterization on a digital map based on the area data of the virtual rail, and label areas of the virtual rail and areas of a non-virtual rail with different attribute values in the rasterized digital map to obtain the digital map comprising the virtual rail;
 a path planning module configured to perform a path planning based on the virtual rail, a current position of the robot, and a cruise end point to obtain a cruise path; and
 a path tracking module configured to obtain one or more control parameters of the robot by calculating through a preset path tracking algorithm based on the cruise path and the current position of the robot and control the robot based on the one or more control parameters;
 wherein the path planning module comprises:
 a position point sub-module configured to take a point of the virtual rail that is closest to the current position of the robot as a rail entry position point and/or take a point of the virtual rail that is closest to the cruise end point as a rail exit position point, if the current position of the robot and/or the cruise end point are not within the virtual rail;
 an off-rail sub-module configured to take a linear path from the current position of the robot to the rail entry position point as a rail entry path and/or take a linear path from the rail exit position point to the cruise end point as a rail exit path;
 an on-rail sub-module configured to perform the path planning through a preset path planning algorithm based on the current position of the robot and the rail exit position point, the rail entry position point and the cruise end point, or the rail entry position point and the rail exit position point to obtain the rail path; and
 a path sub-module configured to connect the rail path with the rail entry path and/or the rail exit path to obtain the cruise path; and
 wherein the performing the path planning through the preset path planning algorithm based on the current position of the robot and the rail exit position point, the rail entry position point and the cruise end point, or the rail entry position point and the rail exit position point to obtain the rail path comprises:
 in response to the current position of the robot being within the virtual rail while the cruise planning algorithm based on the current position of the robot and the rail exit position point to obtain the rail path;
 in response to the current position of the robot being not within the virtual rail while the cruise end point being within the virtual rail, performing the path planning through the preset path planning algorithm based on the rail entry position point and the cruise end point to obtain the rail path; and
 in response to the current position of the robot and the cruise end point being both not within the virtual rail, performing the path planning through the preset path planning algorithm based on the rail entry position point and the rail exit position point to obtain the rail path.

11. The apparatus of claim 10, wherein the path planning module is configured to:
 perform the path planning through a preset path planning algorithm based on the current position of the robot and the cruise end point to obtain the cruise path, in response to the current position of the robot and the cruise end point being both within the virtual rail.

12. The apparatus of claim 10, further comprising:
 a smoothing module configured to smooth the cruise path through a preset curve fitting algorithm to obtain the smoothed cruise path.

13. The apparatus of claim 10, wherein the robot comprises a localization equipment, and the current position for the robot is obtained through the localization equipment.

14. A robot, comprising:
 a localization equipment;
 a memory;
 a processor; and
 one or more computer programs stored in the memory and executable on the processor, wherein the one or more computer programs comprise:
 instructions for obtaining area data of a virtual rail, performing a rasterization on a digital map based on the area data of the virtual rail, and labeling areas of the virtual rail and areas of a non-virtual rail with different attribute values in the rasterized digital map to obtain the digital map comprising the virtual rail;
 instructions for performing a path planning based on the virtual rail, a current position of the robot, and a cruise end point to obtain a cruise path, wherein the current position is obtained through the localization equipment; and
 instructions for obtaining one or more control parameters of the robot by calculating through a preset path tracking algorithm based on the cruise path and the current position of the robot, and controlling the robot based on the one or more control parameters;

wherein the instructions for performing the path planning based on the virtual rail, the current position of the robot, and the cruise end point to obtain the cruise path comprise:

instructions for taking a point of the virtual rail closest to the current position of the robot as a rail entry position point, in response to the current position of the robot being not within the virtual rail;

instructions for taking a point of the virtual rail closest to the cruise end point as a rail exit position point, in response to the cruise end point being not within the virtual rail;

instructions for taking a linear path from the current position of the robot to the rail entry position point as a rail entry path and taking a linear path from the rail exit position point to the cruise end point as a rail exit path;

instructions for performing the path planning through a preset path planning algorithm based on one of the current position of the robot and the rail exit position point, the rail entry position point and the cruise end point, and the rail entry position point and the rail exit position point to obtain the rail path; and instructions for connecting the rail path with at least one of the rail entry path and the rail exit path to obtain the cruise path; and wherein the performing the path planning through the preset path planning algorithm based on one of the current position of the robot and the rail exit position point, the rail entry position point and the cruise end point, and the rail entry position point and the rail exit position point to obtain the rail path comprises:

in response to the current position of the robot being within the virtual rail while the cruise end point being, not within the virtual rail, performing the path planning through the preset path planning algorithm based on the current position of the robot and the rail exit position point to obtain the rail path;

in response to the current position of the robot being not within the virtual rail while the cruise end point being within the virtual rail, performing the path planning through the preset path planning algorithm based on the rail entry position point and the cruise end point to obtain the rail path; and in response to the current position of the robot and the cruise end point being both not within the virtual rail, performing the path planning through the preset path planning algorithm based on the rail entry position point and the rail exit position point to obtain the rail path.

15. The robot of claim 14, wherein the instructions tier performing the path planning based on the virtual rail, the current position of the robot, and the cruise end point to obtain the cruise path comprise:

instructions for performing the path planning through a preset path planning algorithm based on the current position of the robot and the cruise end point to obtain the cruise path, in response to the current position of the robot and the cruise end point being both within the virtual rail.

16. The robot of claim 14, wherein the one or computer programs further comprise:

instructions for smoothing the cruise path through a preset curve fitting algorithm to obtain the smoothed cruise path.

* * * * *